Figure 1:
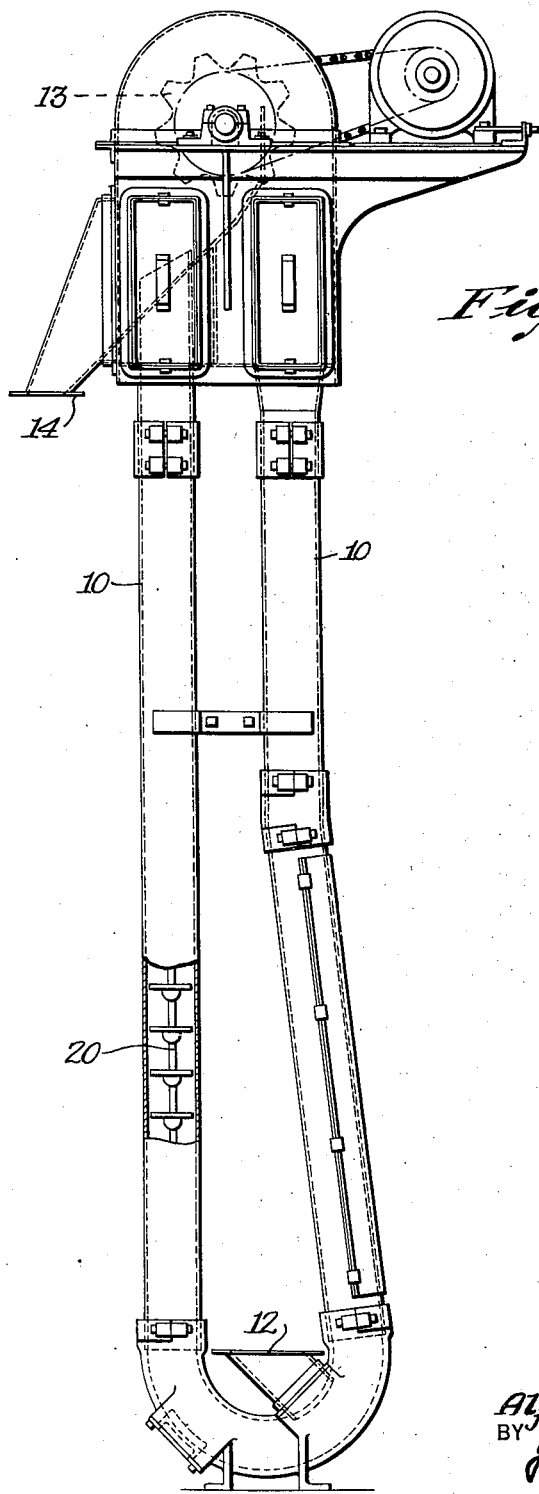

Nov. 30, 1937.  A. D. SINDEN  2,100,924
CONVEYER
Filed Nov. 14, 1934  2 Sheets-Sheet 1

INVENTOR
Alfred Delos Sinden.
BY
J. Stanley Churchill
ATTORNEY

Nov. 30, 1937.  A. D. SINDEN  2,100,924
CONVEYER
Filed Nov. 14, 1934   2 Sheets-Sheet 2
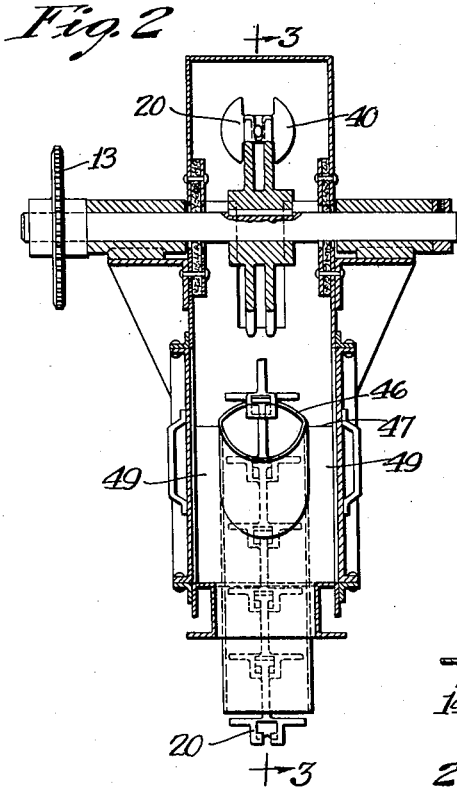
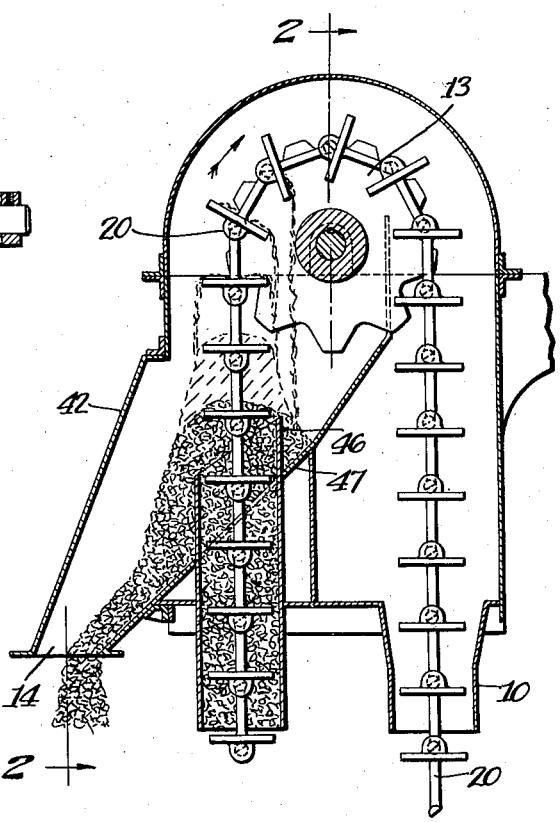
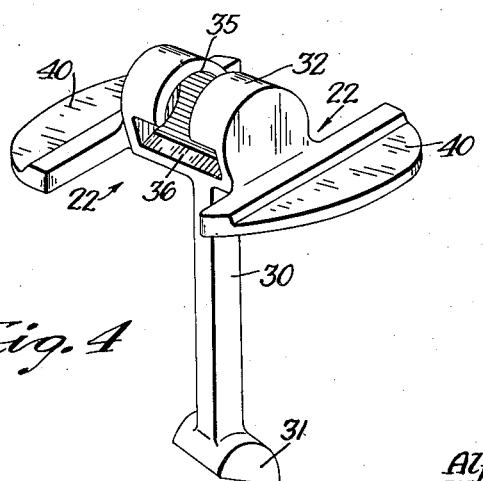
INVENTOR
Alfred Delos Sinden.
BY J. Stanley Churchill.
ATTORNEY Patented Nov. 30, 1937

2,100,924

UNITED STATES PATENT OFFICE 2,100,924

CONVEYER

Alfred De Los Sinden, Aurora, Ill., assignor, by mesne assignments, to Redler Conveyor Company, Quincy, Mass., a corporation of Massachusetts Application November 14, 1934, Serial No. 753,043

3 Claims. (Cl. 198—154)

This invention relates to a conveyer, and more particularly to a conveyer for conveying flowable solid material in a continuous stream.

The object of the invention is to provide a novel and improved construction of conveyer of the character specified in which provision is made for removing the flowable solid material from the conveyer casing, after the supply thereof has been cut off in a novel and efficient manner by continued operation of the conveyer.

With this general object in view, and such others as may hereinafter appear, the invention consists in the conveyer and in the various structures, arrangements and combinations of parts hereinafter described and particularly defined in the claims at the end of this specification.

In the drawings illustrating the preferred embodiment of the invention, Fig. 1 is a side elevation of a conveyer embodying the invention; Fig. 2 is a vertical sectional detail of the upper portion of the conveyer; Fig. 3 is a sectional detail taken on the line 3—3 of Fig. 2; and Fig. 4 is a perspective view of one of the preferred forms of conveyer elements used in the present conveyer.

In general the present invention contemplates the provision of a conveyer of the type forming the subject matter of the Redler Reissue Patent No. 18,445, and in which the transporting element is arranged to be drawn through a casing and to convey the flowable solid material through the casing in a continuous stream. The conveyer member of a conveyer of this type comprises a skeleton structure of open flights, and in accordance with the present invention the individual flights of the conveyer member are so constructed as to present sufficient area to enable the conveyer casing to be cleaned out of the material by running the conveyer member through a few cycles after the supply of material in the casing has been cut off, while retaining the general open flight characteristics of the conveyer and the advantageous features thereof.

In practice, when a conveyer constructed in accordance with the disclosure of the Redler reissue patent, above referred to, is utilized in the conveyance of flowable solid material, such as wheat or flour, the conveyer casing is usually arranged so as to present at least one vertical leg through which the material is conveyed vertically, and at the end of the run it becomes desirable to remove the material which remains in the lower portion of the vertical leg of the conveyer casing. In accordance with the present invention, this result is accomplished by constructing the flights so that they have sufficient bearing surface to pick up and convey this remaining material through the vertical leg of the conveyer casing into an elevated position, from which the material may be discharged through a discharge chute in an automatic manner, prior to the passage of the flights over the pulley at the upper end of the vertical leg of the conveyer casing.

The amount of bearing surface upon the individual open flights most desirable and necessary for the efficient operation of the conveyer in accordance with the present invention, will vary according to the character of the material to be conveyed and of the formation of the particular transporting elements or flights making up the conveyer member, but in any event the formation of the flights will be such as to preserve the open structure thereof to permit the conveyer to function in accordance with the general principles of the conveyer forming the subject matter of the Redler Reissue Patent No. 18,445.

Referring now to the drawings, which as above stated, illustrate the preferred embodiment of the invention, the illustrated conveyer comprises a conveyer casing 10 provided with an inlet 12 and a discharge outlet 14. A conveyer member indicated generally at 20 is arranged to be drawn through the casing by a driving sprocket 13 to convey material from the inlet 12 to the discharge outlet 14. In accordance with the present invention, the conveying element is made up of a plurality of skeleton flights, a preferred form of which is illustrated in detail in Fig. 4. These skeleton flights are so designed as to effect the conveyance of the flowable solid material in a continuous stream in accordance with the principles disclosed in the aforesaid Redler reissue patent, and are characterized particularly by the provision of open spaces 22 between the solid portions of the flight, of sufficient size as will permit the flights to be readily drawn through the mass of material within the casing when the outlet is closed. The particular flight illustrated includes a rigid connecting member 30, provided with an enlargement 31 at one end and a hollow hub 32 at the other end. The hollow hub 32 is slotted in a manner illustrated in Fig. 4 for the reception of the enlargement of a succeeding flight, and to permit the flights to be detached from one another upon pivotal movement into a position such as to permit the enlargement 31 to pass outwardly from within the hub 32 through the transverse slot 35 (Fig. 4). The longitudinal slot 36 in the hub allows necessary pivotal movement between flights so that the flights may pass over the usual driving sprocket 13, mounted on a driven shaft journalled in suitable bearings upon the conveyer casing. As herein shown, the sprocket 13 is arranged to be driven from the motor through a chain and sprocket drive.

In the conveyance of some types of materials, in practice, it becomes desirable to clean out or empty the conveyer casing of the material after a particular run. In a conveyer constructed entirely as illustrated in the Redler reissue patent, when the supply of flowable solid material to the inlet is cut off and the transporting element continues its operation, a column of the material remains in the vertical leg of the conveyer, and the skeleton form member pulls through the material without elevating it. In accordance with the present invention, the conveyer member is made of a special construction, which for convenience of description may be regarded as of a partial skeleton form, so that after the supply of material to the conveyer inlet is cut off, continued operation of the conveyer member serves to gradually clean out the casing of the material which would otherwise remain therein. To this end, some and preferably all of the conveyer elements or flights are provided with wings 40, affording additional bearing surface upon which some of this remaining material may accumulate to be transported up through the vertical leg of the conveyer casing into a position where it may be discharged from the conveyer casing through a suitable discharge chute 42. These wings 40 may take various forms, but are preferably designed to closely conform to or fit the outer portions of the casing, and while with different materials varying sizes of such wings are required, nevertheless the wings are so designed as to retain a sufficient size of opening between them as to enable the conveyer element to function in accordance with the principles of the conveyer forming the subject matter of the Redler reissue patent aforesaid, and which, in general, comprises the conveyance of the flowable solid material in a continuous stream through the conveyer casing and the ability to pull through the material in the event that the outlet becomes closed to thereby prevent jamming of the conveyer.

In the illustrated form of conveyer, the conveyer casing on the vertical leg of the conveyer is arranged to terminate within a discharge chute 45 and the end 46 of the conveyer casing is preferably located above the lower inclined wall 47 of the chute, and the latter is arranged at an angle greater than the angle of repose of the material, so that the material will readily flow therefrom. As clearly illustrated in Fig. 2, the chute is so designed as to provide lateral passages 49 upon opposite sides of the end 46 of the conveyer casing, and as a result, when it is desired to clean out the conveyer casing at the end of any particular run, the inlet 12 is closed and the conveyer operated, whereby all of the material is elevated through the vertical leg of the conveyer casing, the last part of the material being elevated on inclined wings or bearing surfaces as above described. In this manner, the entire conveyer may be freed from material in a simple and economical manner.

In the preferred embodiment of the invention, the discharge chute 45 is located adjacent and immediately below the head sprocket 50 over which the conveyer member passes, and in order to collect the material being discharged from the bearing surfaces or wings 40 as the latter pass from a horizontal to a vertical position in passing over the head sprocket, the discharge chute 45 is arranged to extend upwardly under the head sprocket 50 at an angle greater than the angle of repose of the material, so that as the material emerges from the end 46 of the conveyer casing it will readily pass outwardly through the discharge chute.

While the preferred embodiment of the invention has been herein illustrated and described, it will be understood that the invention may be embodied in other forms within the scope of the following claims.

Having thus described the invention, what is claimed is:—

1. In a conveyer of the character described, in combination, a conveyer casing provided with a vertical leg, a conveyer member comprising a plurality of connected open flights traversable through the casing, a head sprocket over which the conveyer member is arranged to pass, said open flights being constructed and arranged to carry up a substantial amount of material upon the surfaces of the flights into a position where such amounts are discharged from the flights as the same pass over the head sprocket whereby to clean out the conveyer casing at the end of the operation of the conveyer, and means disposed under the head sprocket for receiving said material and discharging it from the conveyer, said vertical leg extending into said means.

2. In a conveyer of the character described, in combination, a conveyer casing having a vertical leg and an inlet and an outlet, a conveyer member traversable through the casing comprising a plurality of open flights, each flight consisting of a hub provided with wings extending in opposite directions beyond said hub to provide open spaces between said wings, and having a rigid connecting member projecting therefrom and an enlargement upon the end of the projecting member for the reception in the hub of a succeeding flight, the area of said wings being so related to the area of the open spaces between said wings as to enable the flights to convey the material through the casing in a continuous stream to pull through the material without jamming when a choke occurs, and also to carry up the vertical leg all of the material remaining within the conveyer casing after the supply has been cut off upon the operation of the conveyer through a few runs.

3. In a conveyer of the character described, in combination, a conveyer casing provided with a vertical leg, and a conveyer member comprising a plurality of connected open flights traversable through the casing, a head sprocket over which the conveyer member is arranged to pass, and a discharge chute having its bottom wall extended upwardly and terminating in close proximity below the head sprocket, said vertical leg of the conveyer casing projecting into the discharge chute and terminating a short distance above said bottom wall.

ALFRED DE LOS SINDEN.